July 3, 1934.   O. U. ZERK   1,965,021
LUBRICATING APPARATUS
Filed May 19, 1930   3 Sheets-Sheet 2
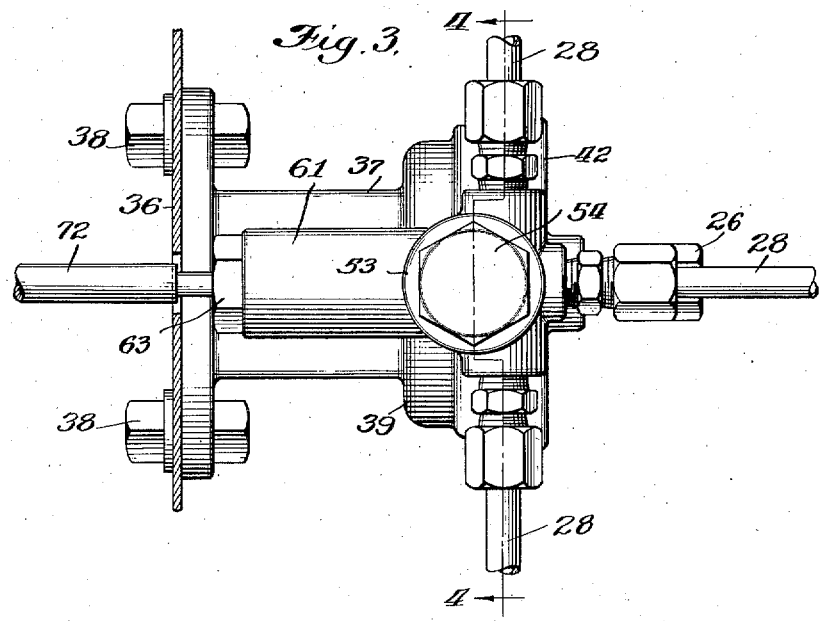
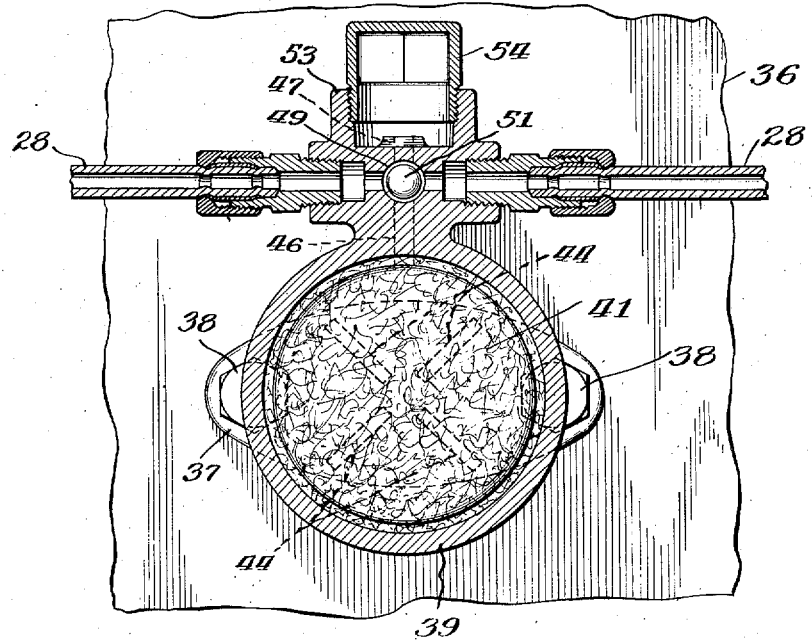
Inventor
Oscar U. Zerk
By Williams Bradbury McCaleb & Hinkle
Attys.

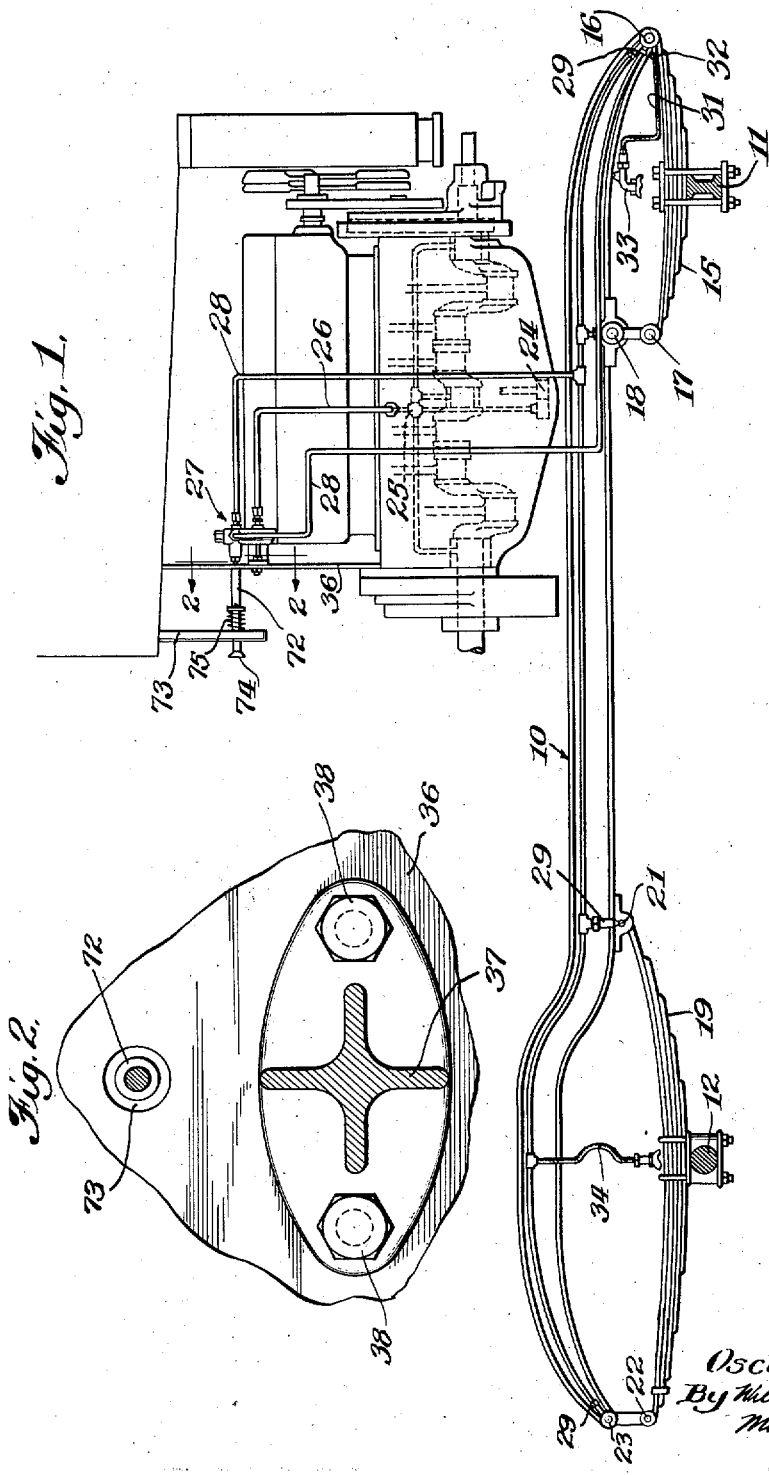

July 3, 1934.  O. U. ZERK  1,965,021
LUBRICATING APPARATUS
Filed May 19, 1930   3 Sheets-Sheet 3
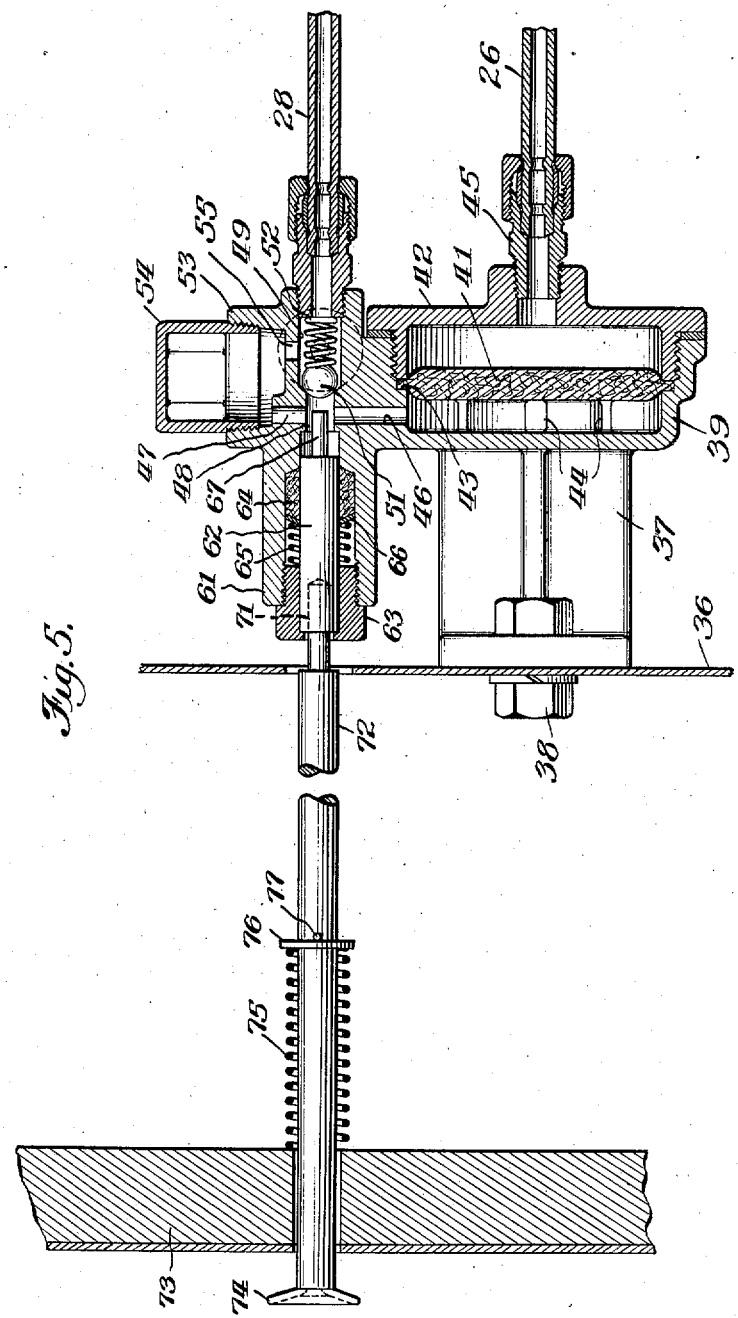
Inventor
Oscar U. Zerk
By Williams Bradbury McCaleb & Hinkle
Attys.

Patented July 3, 1934

1,965,021

UNITED STATES PATENT OFFICE 1,965,021

LUBRICATING APPARATUS

Oscar U. Zerk, Chicago, Ill., assignor to Alemite Corporation, Chicago, Ill., a corporation of Delaware Application May 19, 1930, Serial No. 453,486

5 Claims. (Cl. 184—7)

My invention relates to improvements in lubricating systems and is particularly concerned with, though not limited to, the provision of a lubricating system for use on automotive vehicles.

Lubricating systems are known in which the power for operating the system is derived from the motor of the vehicle, in which lubricant is supplied to a plurality of bearings upon the actuation of a device for causing the system to become effective to supply lubricant to the bearings. However, it is desirable in this type of apparatus to provide a measured amount of lubricant which is not controlled by the length of time the device is actuated and which exerts a pressure upon the lubricant for a considerable period of time while the lubricant passes through resistance devices to the bearings.

An object of the invention is to provide a novel type of lubricating system whereby a plurality of bearings can be conveniently lubricated by the operator while the motor is in operation.

A further object is to provide a lubricating system in which a measured amount of fluid is supplied to a plurality of bearings each time the system is operated.

A further object is to provide a lubricating system for supplying lubricant to a plurality of bearings whereby pressure is exerted upon the lubricant for a longer period than that required for the operator to actuate the system.

A further object is to provide a lubricating system for supplying lubricant to a plurality of bearings deriving its operating power from the motor and adapted to exert a pressure on the lubricant directed toward the bearings for a longer period than the period during which lubricant under pressure is admitted to the system.

A further object is to provide a lubricating system in which a simple operation by the operator causes the lubricant to be stored under pressure and gradually supplied to the bearings of a vehicle.

Other objects and advantages will appear as the description proceeds.

Referring to the drawings:

Fig. 1 is a somewhat schematic view of a lubricating system embodying my invention;

Fig. 2 is a section taken on line 2—2 of Fig. 1;

Fig. 3 is a plan view of the lubricant distributor mechanism;

Fig. 4 is a section taken on line 4—4 of Fig. 3; and

Fig. 5 is a longitudinal section of the lubricant distributor mechanism.

I have illustrated my invention as being applied to an automobile chassis comprising the side frame member 10 and the front and rear axles 11 and 12, respectively, that are supported by wheels not shown. The front axle 11 supports a spring 15 of conventional design that is connected with the frame member 10 by the usual shackle bolts 16, 17 and 18. The rear axle 12 supports a spring 19 that is connected with the frame member 10 by shackle bolts 21, 22 and 23.

The engines or motors of motor vehicles are provided with lubricating systems embodying a pump 24 located at or near the bottom of the crank case and which withdraws the oil from the crank case and forces it to the various bearings of the engine, the excess oil returning to the crank case.

In the present invention a T-joint 25 is connected to the tube leading from the pump for diverting a portion of the oil from the engine lubricating system through a tube 26 to a lubricant distributing mechanism 27 from which the oil for the chassis passes through a plurality of tubes 28 to the chassis bearings to be lubricated. Interposed between the supply tubes 28 and each bearing is a resistance device 29 which causes the lubricant to pass gradually into the bearing. Any type of resistance device well known in the art may be used. One type of resistance device which is particularly well adapted for this purpose is disclosed in my co-pending application, Serial No. 207,609, filed July 22, 1927. The lubricant may be conducted from tubes 28 to any bearing of the chassis. Thus the tube 31 is shown connected to tube 28 through a swivel joint 32. Tube 31 is made of flexible material and leads to the steering wheel assembly 33. Toward the rear of the machine, tube 34 is shown leading to the bearings of the rear wheel brake mechanism. While only one side of the chassis is shown in Fig. 1, it will be understood that the other side is similar and that numerous other bearings not shown may be supplied with lubricant from the system.

The lubricant mechanism is mounted upon the dash 36 of the vehicle body by a star-shaped bracket 37 secured to the dash by bolt 38. The bracket 37 integrally supports a cup-shaped filter chamber 39. A cap 42 closes the open side of the chamber and serves to clamp a filter member 41 of felt or other suitable material against a shoulder 43 formed in the chamber.

Tube 26 from the pump 24 is connected by a plug 45 through the cap 42 to the filter chamber and the fluid entering the filter chamber passes through filter 41 into a passage 46 leading upwardly therefrom. A plurality of supports 44 are provided to prevent the pressure of the fluid from forcing the filter member from its annular support.

For convenience in manufacturing the passage 46 is drilled from above through the entire casting of the distributor and the upper portion of the passage is then closed by a plug 47. A passage 48 is provided in the casting transversely of passage 46 and leads into a valve chamber 49 of slightly greater diameter than passage 48, thus providing a seat for ball 51 which is resiliently urged to its seat by a spring 52. Above the valve chamber 49 the casting is provided with a threaded boss 53 adapted to receive a similarly threaded cap 54 providing a hermetically sealed chamber into which lubricant may be forced through aperture 55 to compress the air within the chamber. The compressed air within the chamber exerts a pneumatic pressure upon the lubricant to force it into the distributing tubes 28.

The distributor casting is also provided with a cylindrical boss 61 having a plunger 62 reciprocably mounted therein and retained therein by a cap 63 threaded into the end of the boss. The plunger 62 is surrounded by packing 64 held under compression by a spring 65 which is mounted between the end of plug 63 and a washer 66. The end of the plunger is provided with a pin 67 which extends into passage 48 and is adapted upon a forward movement of the plunger to unseat ball valve 51 and allow lubricant to pass from the filter chamber into the pneumatic storage chamber 54.

The opposite end of the plunger is provided with a pocket 71 for slidably receiving the end of a push rod 72. Push rod 72 extends rearwardly through the instrument board 73 and has a thumb piece 74 secured to its end by which the rod is actuated. An anti-rattling spring 75 is interposed between the instrument board and a washer 76 retained upon the rod by a pin 77. This spring also serves to lightly engage the forward end of the rod with the pocket 71 in the plunger.

The operation of the system is as follows: During the operation of the motor of the vehicle a continuous pressure is maintained by pump 24 which is communicated through tube 26 to the filter chamber 39. This lubricant pressure extends upwardly through passage 46 into passage 48 where its effect is to produce a pressure on the plunger 62 of sufficient intensity to maintain this plunger in its retracted position against the slight pressure of spring 75. When in its retracted position the friction exerted on the plunger by packing 64 is sufficient to retain it in this position. The pressure of the lubricant in passage 48 is also exerted against the ball valve 51. However, the spring 52 is made of such a strength as to maintain the valve closed against the oil pressure from the motor operated pump.

In order to admit lubricant to the pneumatic chamber 54 the operator depresses push rod 72, causing the reduced end of the plunger to unseat valve 51. Lubricant will then pass through the valve chamber and through aperture 55 into the pneumatic chamber 54. On account of the resistance elements 29 interposed between the bearings and the supply tubes 28 the rate of lubricant flow through tubes 28 is quite low, allowing the lubricant to accumulate in chamber 54.

When the pressure upon the push rod is released by the operator the lubricant pressure returns plunger 62 to its retracted position and spring 52 serves to close valve 51. The pressure upon the lubricant in the supply tubes 28, however, continues after the supply from the motor pump is interrupted due to the compressed air in the upper portion of chamber 54. The lubricant will then gradually be forced over an extended period of time through supply tubes 28 to the bearings. It will be noted that the time during which the push rod 72 is depressed is not important as long as it is depressed sufficiently long to allow the lubricant to build up a counterpressure in the chamber 54 substantially equal to the pressure of the lubricant from the pump. The quantity of lubricant supplied to the system upon the actuation of the push rod will, therefore, be dependent primarily upon the size of chamber 54 provided the push rod is depressed long enough to allow the lubricant to enter this chamber and compress the air therein.

Having described the nature and embodiments of my invention, what I desire to secure by United States Letters Patent is as follows:

1. In a lubricating system for a motor vehicle having a plurality of bearings, supply tubes leading to the bearings, means for storing lubricant under pressure communicating with said tubes, power operated lubricant supply means for providing lubricant under pressure, a valve for resisting the fluid pressure from said supply means, a plunger for actuating said valve to admit lubricant to said storing means and manually operable means extending into convenient reach of the operator for actuating said plunger.

2. In a lubricating system for a motor vehicle having a plurality of bearings, a supply tube leading to said bearings, means for storing lubricant under pressure communicating with said tube, lubricant filtering means, a supply pump for supplying lubricant through said filtering means to said storing means, a valve normally preventing the fluid from the filtering means from entering said storing means, a plunger adapted to actuate said valve allowing fluid from the filtering means to enter the storing means, said plunger having a pocket in one end, a push rod loosely engaging the pocket of the plunger, and a spring for retaining the end of the push rod in said pocket.

3. In a lubricating system for a motor vehicle having a plurality of bearings, the combination of a tube leading to said bearings, a pneumatic chamber providing a lubricant container in constant communication with said tube, a pump operated by the motor of said vehicle for supplying lubricant under pressure to said chamber and for creating a condition of pressure therein, a valve normally preventing the flow of lubricant to said chamber, and manipulative means for opening said valve for permitting a quantity of lubricant to enter the container under pressure.

4. In a lubricating system for a motor vehicle having a plurality of bearings, a pneumatic pressure means for supplying lubricant to the bearings, motor operated means for supplying lubricant to said pressure means, said pressure means deriving energy from said motor operated means, a valve normally preventing the flow of lubricant from the motor operated means to said pressure means and a manual control mounted upon the dashboard of the vehicle for opening said valve thereby to render said motor operated means effective for supplying lubricant to said pressure means.

5. In a lubricating system for a motor vehicle having a plurality of bearings, a lubricant line leading to the bearings, restricting means adjacent said bearings, a pneumatic chamber communicating adjacent its bottom with a passageway communicating with the line, motor operated means for supplying lubricant to said chamber under pressure, a valve comprising a valve seat, a valve member and a spring for engaging the member with the seat, said valve being interposed between the pneumatic chamber and said motor operated means, and means for actuating said valve to admit lubricant from said motor operated means into said chamber and said line whereby the lubricant will be gradually forced to said bearings.

OSCAR U. ZERK.

DISCLAIMER 1,965,021.—*Oscar U. Zerk*, Chicago, Ill. LUBRICATING APPARATUS. Patent dated July 3, 1934. Disclaimer filed August 23, 1935, by the assignee, *Stewart-Warner Corporation*.

Hereby enters this disclaimer to that part of the claims in said specification which is in the following words, to-wit:

"1. In a lubricating system for a motor vehicle having a plurality of bearings, supply tubes leading to the bearings, means for storing lubricant under pressure communicating with said tubes, power operated lubricant supply means for providing lubricant under pressure, a valve for resisting the fluid pressure from said supply means, a plunger for actuating said valve to admit lubricant to said storing means and manually operable means extending into convenient reach of the operator for actuating said plunger."

"4. In a lubricating system for a motor vehicle having a plurality of bearings, a pneumatic pressure means for supplying lubricant to the bearings, motor operated means for supplying lubricant to said pressure means, said pressure means deriving energy from said motor operated means, a valve normally preventing the flow of lubricant from the motor operated means to said pressure means and a manual control mounted upon the dashboard of the vehicle for opening said valve thereby to render said motor operated means effective for supplying lubricant to said pressure means.

"5. In a lubricating system for a motor vehicle having a plurality of bearings, a lubricant line leading to the bearings, restricting means adjacent said bearings, a pneumatic chamber communicating adjacent its bottom with a passageway communicating with the line, motor operated means for supplying lubricant to said chamber under pressure, a valve comprising a valve seat, a valve member and a spring for engaging the member with the seat, said valve being interposed between the pneumatic chamber and said motor operated means, and means for actuating said valve to admit lubricant from said motor operated means into said chamber and said line whereby the lubricant will be gradually forced to said bearings."

[*Official Gazette September 17, 1935.*]

having a plurality of bearings, a lubricant line leading to the bearings, restricting means adjacent said bearings, a pneumatic chamber communicating adjacent its bottom with a passageway communicating with the line, motor operated means for supplying lubricant to said chamber under pressure, a valve comprising a valve seat, a valve member and a spring for engaging the member with the seat, said valve being interposed between the pneumatic chamber and said motor operated means, and means for actuating said valve to admit lubricant from said motor operated means into said chamber and said line whereby the lubricant will be gradually forced to said bearings.

OSCAR U. ZERK.

DISCLAIMER 1,965,021.—*Oscar U. Zerk*, Chicago, Ill. LUBRICATING APPARATUS. Patent dated July 3, 1934. Disclaimer filed August 23, 1935, by the assignee, *Stewart-Warner Corporation*.

Hereby enters this disclaimer to that part of the claims in said specification which is in the following words, to-wit:

"1. In a lubricating system for a motor vehicle having a plurality of bearings, supply tubes leading to the bearings, means for storing lubricant under pressure communicating with said tubes, power operated lubricant supply means for providing lubricant under pressure, a valve for resisting the fluid pressure from said supply means, a plunger for actuating said valve to admit lubricant to said storing means and manually operable means extending into convenient reach of the operator for actuating said plunger."

"4. In a lubricating system for a motor vehicle having a plurality of bearings, a pneumatic pressure means for supplying lubricant to the bearings, motor operated means for supplying lubricant to said pressure means, said pressure means deriving energy from said motor operated means, a valve normally preventing the flow of lubricant from the motor operated means to said pressure means and a manual control mounted upon the dashboard of the vehicle for opening said valve thereby to render said motor operated means effective for supplying lubricant to said pressure means.

"5. In a lubricating system for a motor vehicle having a plurality of bearings, a lubricant line leading to the bearings, restricting means adjacent said bearings, a pneumatic chamber communicating adjacent its bottom with a passageway communicating with the line, motor operated means for supplying lubricant to said chamber under pressure, a valve comprising a valve seat, a valve member and a spring for engaging the member with the seat, said valve being interposed between the pneumatic chamber and said motor operated means, and means for actuating said valve to admit lubricant from said motor operated means into said chamber and said line whereby the lubricant will be gradually forced to said bearings."

[*Official Gazette September 17, 1935.*]